(12) United States Patent
Walls et al.

(10) Patent No.: US 7,245,054 B1
(45) Date of Patent: Jul. 17, 2007

(54) PERMANENT MAGNET ELECTRIC MACHINE HAVING REDUCED COGGING TORQUE

(75) Inventors: Todd A. Walls, Rock Hill, MO (US); Alan D. Crapo, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 456 days.

(21) Appl. No.: 09/704,183

(22) Filed: Nov. 1, 2000

(51) Int. Cl.
*H01K 21/12* (2006.01)
(52) U.S. Cl. .............................. 310/156.25; 310/156.47
(58) Field of Classification Search ............. 310/156.6, 310/45, 156.01, 156.38, 156.43, 156.45, 310/156.46, 156.47, 156.25, 46, 49 R; *H01K 21/12*
See application file for complete search history.

(56) References Cited

U.S. PATENT DOCUMENTS

| | | | |
|---|---|---|---|
| 3,979,821 A | 9/1976 | Noodleman | |
| 4,739,201 A * | 4/1988 | Brigham et al. | ........... 310/49 R |
| 4,739,203 A | 4/1988 | Miyao et al. | |
| 4,845,837 A | 7/1989 | Lloyd | |
| 4,933,584 A | 6/1990 | Harms et al. | |
| 4,953,284 A | 9/1990 | Hammer et al. | |
| 5,034,642 A | 7/1991 | Hoemann et al. | |
| 5,164,622 A * | 11/1992 | Kordik | ...................... 310/67 R |
| 5,250,867 A | 10/1993 | Gizaw | |
| 5,397,951 A * | 3/1995 | Uchida et al. | ......... 310/156.21 |
| 5,563,463 A | 10/1996 | Stark | |
| 5,610,464 A | 3/1997 | Asano et al. | |
| 5,753,991 A | 5/1998 | Couture et al. | |
| 5,886,440 A * | 3/1999 | Hasebe et al. | ......... 310/156.19 |
| 6,031,304 A | 2/2000 | Suzuki et al. | |
| 6,034,459 A | 3/2000 | Matsunobu et al. | |
| 6,034,460 A | 3/2000 | Tajima et al. | |
| 6,040,647 A | 3/2000 | Brown et al. | |
| 6,252,323 B1 * | 6/2001 | Nishikawa et al. | .... 310/156.01 |
| 6,657,349 B2 * | 12/2003 | Fukushima | ............ 310/156.47 |
| 6,940,205 B1 * | 9/2005 | Murakami et al. | ..... 310/156.01 |

* cited by examiner

*Primary Examiner*—Darren Schuberg
*Assistant Examiner*—Karen Addison
(74) *Attorney, Agent, or Firm*—Harness, Dickey & Pierce, P.L.C.

(57) ABSTRACT

A permanent magnet electric machine includes a stator with salient stator poles. A rotor includes two or more axial rotor sections that are rotationally offset by an offset angle equal to the cogging angle divided by the number of axial rotor sections. The axial rotor sections include rotor poles with permanent magnets. In one embodiment, the permanent magnet electric machine has a 12/10 slot/pole combination. The permanent magnets have a magnet dimension angle between 31 and 35 degrees. An air gap ratio of the electric machine is between 1.35 and 2.5. A slot opening ratio of the electric machine is less than or equal to one. In another embodiment, the permanent magnet electric machine has an 18/12 slot/pole combination. The permanent magnets have a magnet dimension angle that is between 25 and 28 degrees. An air gap ratio of the electric machine is between 1.35 and 2.5. A slot opening ratio of the electric machine is less than or equal to one.

28 Claims, 5 Drawing Sheets

PERMANENT MAGNET ELECTRIC MACHINE HAVING REDUCED COGGING TORQUE

FIELD OF THE INVENTION

This invention relates to permanent magnet electric machines, and more particularly to permanent magnet electric machines having reduced cogging torque.

BACKGROUND OF THE INVENTION

Permanent magnet electric machines, such as motors and generators, include a stationary stator that defines salient poles and inter-pole slots that are located between the salient poles. The stator is often mounted on an inner surface of a machine housing with the salient poles projecting radially inwardly. The permanent magnet electric machines also include a rotor that is mounted on a shaft, that includes rotor poles and that rotates on the shaft relative to the stator. The rotor poles include permanent magnets that are attached to a radially outer surface of the rotor. Winding wire is wound around the stator poles in the stator slots. A circuit board or another connection device couples the stator pole windings to a drive circuit. The drive circuit generates a set of stator winding currents that are output to the stator pole windings and that result in a rotating magnetic field. The rotating magnetic field in the stator poles attracts the poles of the rotor to cause the rotor to rotate.

Electric machines with permanent magnet rotors often have cogging torque that adversely impacts machine performance. Cogging torque is caused by the variation of magnetic permeance as seen by a rotor pole as it passes the stator poles and the slot openings. Cogging torque occurs when the stator windings are un-energized. The rotor seeks a rotational position that results in the lowest magnetic circuit reluctance (or the highest permeance). The rotational position with the lowest magnetic circuit reluctance occurs when a rotor pole is aligned with a stator pole. When the rotor pole is aligned with a slot opening, the rotor pole will attempt to align itself with a stator pole, thereby producing torque. The cogging torque oscillates between positive and negative torque, depending on the position of the rotor poles with respect to the stator poles. The torque oscillations cause vibration and noise within the permanent magnet electric machine. The variation in torque can also cause vibration in the equipment that is driven by the machine, which causes additional noise.

Various methods for reducing cogging torque have been proposed. In one method, the permanent magnets are skewed in an angled pattern or in a herringbone pattern on the outer surface of the rotor. Skewing the permanent magnets increases material and manufacturing costs due to the complex and non-uniform shape of the permanent magnets. The non-uniform permanent magnets are also difficult to assemble.

Therefore, a permanent magnet electric machine that significantly reduces cogging torque and that can be assembled relatively easily and with relatively low manufacturing costs would be desirable.

SUMMARY OF THE INVENTION

A permanent magnet electric machine according to the invention includes a stator and a rotor. The rotor includes n axial rotor sections with permanent magnets where n is an integer greater than one. The n axial rotor sections are rotationally offset by an offset angle equal to a cogging angle divided by n. The permanent magnet electric machine produces n cogging torque waveforms that are substantially sinusoidally-shaped. The n cogging torque waveforms substantially cancel.

According to other features of the invention, the permanent magnet electric machine has a 12/10 slot/pole combination. The permanent magnets have a magnet dimension angle that is between 31 and 35 degrees. If two axial rotor sections are employed, they are rotationally offset by 3 degrees. If additional axial rotor sections are employed, the offset angle for all of the axial rotor sections is equal to the cogging angle divided by the number of axial rotor sections. An air gap ratio of the electric machine is between 1.35 and 2.5. A slot opening ratio of the electric machine is less than or equal to one.

According to other features of the invention, the permanent magnet electric machine has an 18/12 slot/pole combination. The permanent magnets have a magnet dimension angle that is between 25 and 28 degrees. If two axial rotor sections are employed, they are rotationally offset by 5 degrees. If additional axial rotor sections are employed, the offset angle for all of the axial rotor sections is equal to the cogging angle divided by the number of axial rotor sections. An air gap ratio of the electric machine is between 1.35 and 2.5. A slot opening ratio of the electric machine is less than or equal to one.

Other objects, features and advantages will be apparent from the specification, the drawings and the claims that follow.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

The permanent magnet electric machine according to the invention dramatically reduces cogging torque by providing a rotor with two or more axial rotor sections. The axial rotor sections are rotationally offset by an offset angle that is equal to the cogging angle divided by the number of axial rotor sections. The axial rotor sections have optimized dimensions that produce symmetric, sinusoidally-shaped cogging torque waveforms that substantially cancel each other due to the offset angle of the axial rotor sections. The optimized dimensions are defined by an air-gap ratio, a slot-opening ratio and a magnet dimension angle that will be described further below. The permanent magnet electric machine provides a significant reduction in the composite cogging torque waveform.

Figure 1:
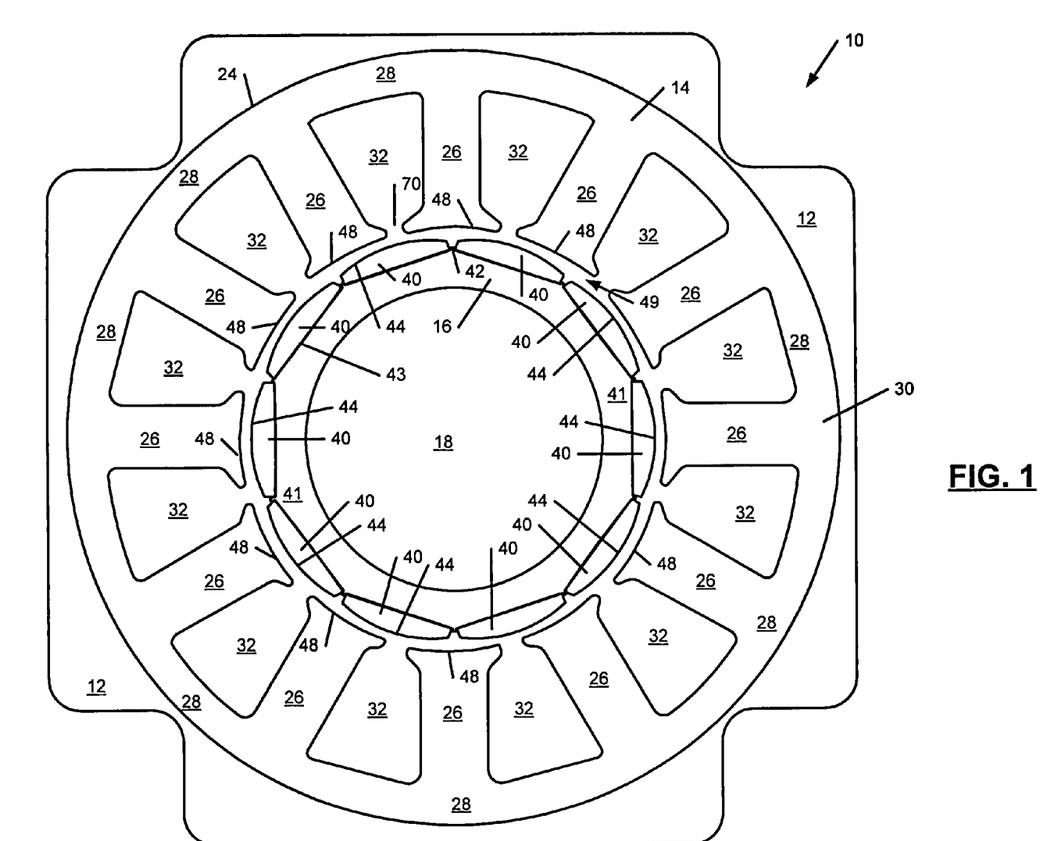
FIG. 1 illustrates a housing, a stator, a rotor and permanent magnets of a permanent magnet electric machine according to present invention.

Referring now to FIG. 1, an electric machine 10 is illustrated and includes a housing 12, a stator 14, a rotor 16, and a shaft 18. The stator 14 is mounted on an inner surface 24 of the housing 12. The stator 14 includes a plurality of stator poles 26 that project radially inwardly from an outer rim 28 of the stator 14. The stator 14 includes a stator core with a stack of stator plates that are interconnected in any suitable manner. Alternately, the stator core can be solid. While an un-segmented stator 14 is shown, a segmented stator can also be employed. One or more pairs of slits (not shown) are made in the stator plates when they are die cut. After the stator plates are stacked, a punch is used to deform a central portion between the slits. The deformed central portion holds the stack of stator plates together. Alternately, the stack of stator plates can be connected together using adhesives or any other suitable method.

The housing 12 and the stator 14 are assembled using press fit, hot drop or other suitable methods. In the hot drop method, the housing 12 is heated and expanded. The stator 14 is positioned using a fixture and the housing is "hot dropped" onto the stator 14. As the housing 12 cools, it contracts to provide an interference fit with the stator 14. In the press fit method, the stator 14 is positioned on the fixture and the housing 12 is press fit over the stator 14.

In FIG. 1, an outermost stator plate 30 of the stack is illustrated. The remaining stator plates 30 of the stack have a similar configuration as the outermost stator plate 30. Inter-pole stator slots 32 are located between adjacent stator poles 26. While not shown in FIG. 1, the stator 14 also includes winding wire that is wound around the stator poles 26 (using needle winding, transfer winding, computer numerical control (CNC) winding or other suitable winding methods) in the inter-pole stator slots 32. Opposite ends of the winding wire are connected to terminals that, in turn, are connected to the drive circuit. The terminals can be connected to end caps (not shown) that are connected on opposite face surfaces of the stack of stator plates. Alternately, the opposite ends of the winding wire can be connected directly to the drive circuit without the end caps and the terminals. Insulating material can also be positioned between the winding wire and the stator poles 26 and on outer surface of the winding wire on adjacent stator poles 26 in a conventional manner.

As will be described further below in conjunction with FIGS. 5A and 5B, the rotor 16 includes two or more axial rotor sections that are rotationally offset by an offset angle that is equal to the cogging angle divided by the number of axial rotor sections. The rotor 16 includes a rim section 41 and a radially outer surface 42 that includes magnet attachment surfaces 43 that may include grooves for receiving adhesive. Permanent magnets 40 are preferably adhered to the magnet attachment surfaces 43 on the radially outer surface 42 of the rotor 16. Other methods of attachment may also be employed. A radially outer crown surface 44 of the permanent magnets 40 and a radially inner surface 48 of the stator poles 26 define an air gap 49.

In the embodiment in FIG. 1, the stator 14 has twelve stator slots 32 (or stator poles 26) and the rotor 16 has ten rotor poles (or permanent magnets 40) in first and second axial rotor sections. In this embodiment, the stator has an outer diameter of 101.7 mm. A radially inner surface of the outer rim 28 has a diameter of 91.5 mm. The stator poles 26 have a width of 8.2 mm. The stator poles 26 are spaced at 30 degree intervals. The radially inner surface 48 of the stator poles 26 has a diameter of 55.5 mm. The stator slot opening 70 is 2.2 mm.

Figure 2:
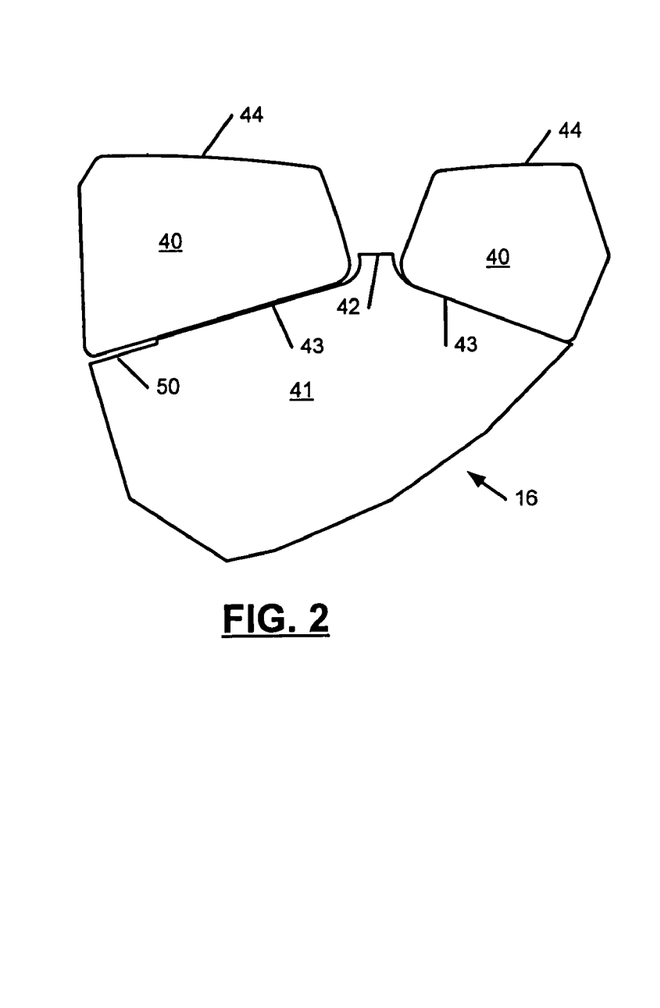
FIG. 2 illustrates a partial view of the rotor between two adjacent permanent magnets.
Figure 3:
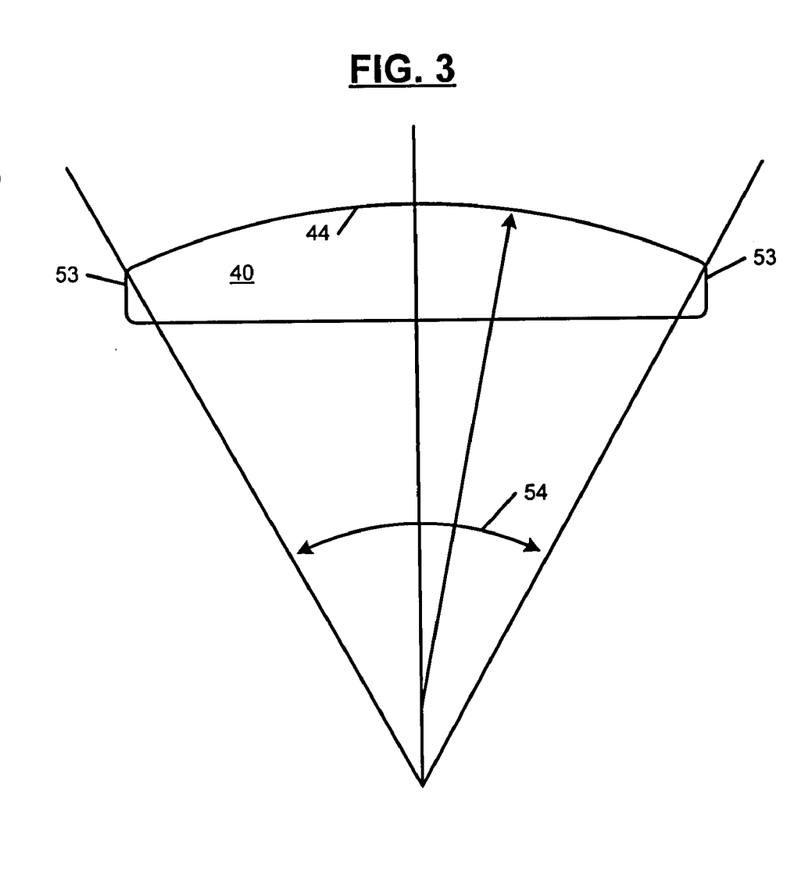
FIG. 3 is a side view of a permanent magnet that illustrates a crown radius and a magnet dimension angle according to the present invention.

Referring now to FIG. 2, details relating to the attachment of the permanent magnets 40 to the rotor 16 are illustrated in further detail. The magnet attachment surfaces 43 include a groove 50 in the magnet attachment surfaces 43 for receiving adhesive to attach the permanent magnets 40 to the radially outer surface 42 of the rotor 16. The radially outer surface 42 of the rotor 16 includes a projection 52 that is located between the adjacent magnet attachment surfaces 43. Referring now to FIG. 3, the permanent magnets 40 have a bread loaf shape. In one embodiment, the permanent magnets 40 have a thickness of 3.0 mm, a length of 21.0 mm, and a width of 15.1 mm. The radially outer crown surface 44 preferably has a radius of 19.0 mm. Opposite lateral edges 53 of the permanent magnets 40 have a thickness of 1.4 mm.

The permanent magnets 40 according to the present invention have a magnet dimension angle that is identified at 54. The magnet dimension angle 54 is measured from a center of the rotor 16 to the opposite lateral edges 53 of the radially outer crown surface 44 of the permanent magnets 40. The magnet dimension angle 54 according to the invention is preferably between 31 and 35 degrees for the electric machine 10 with the 12/10 slot/pole combination. In a preferred embodiment, the magnet dimension angle 54 is approximately 33 degrees.

Figure 4:
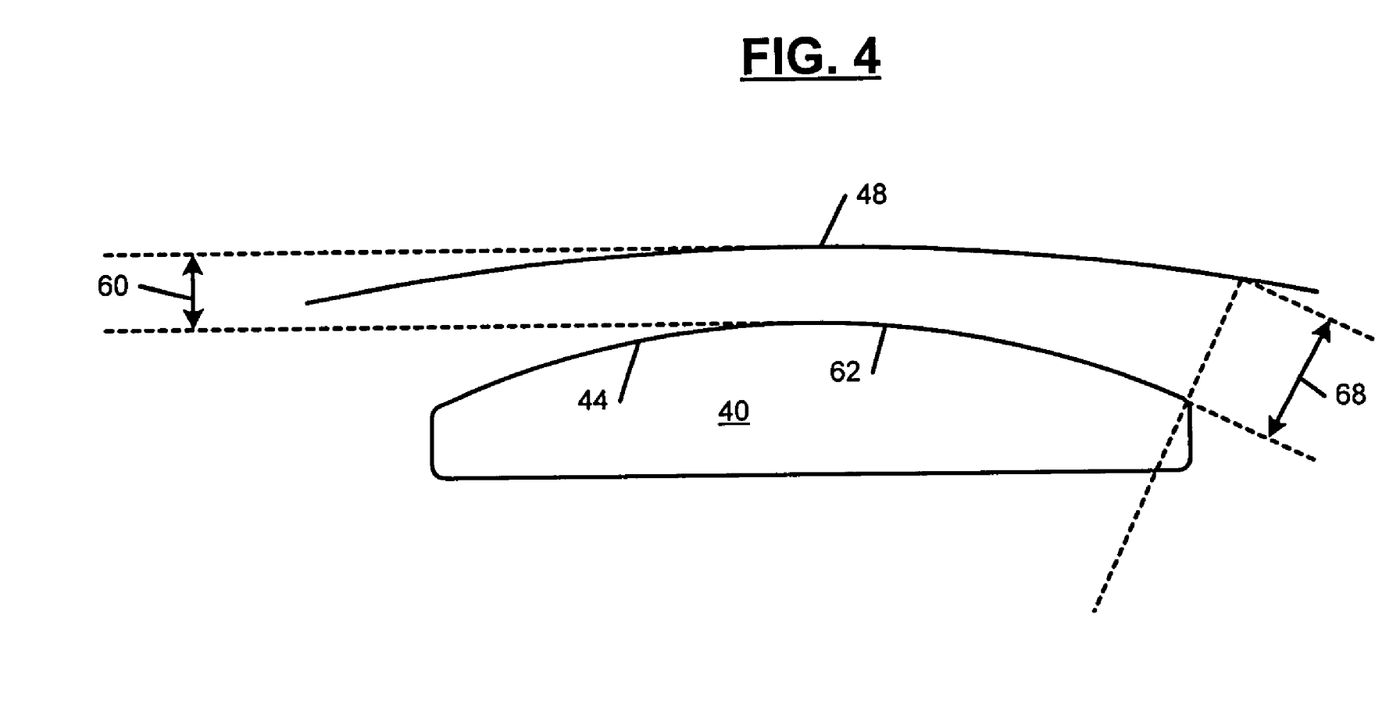
FIG. 4 is a view that is similar to FIG. 3 and that illustrates a center gap and an edge gap of the permanent magnet of FIG. 3.

Referring now to FIG. 4, a center gap is identified at 60. The center gap 60 is a minimum distance between a peak 62 of the radially outer crown surface 44 of the permanent magnet 40 and the radially inner surface 48 of the stator 14. An edge gap is identified at 68. The edge gap 68 is defined as a distance between the outer lateral edge 53 of the radially outer crown surface 44 of the permanent magnet 40 and the radially inner surface 48 (or inner diameter) of the stator 14 taken along a radial line of the rotor. An air-gap ratio is defined as the edge gap 68 divided by the center gap 60. Preferably the air-gap ratio is between 1.35 and 2.5.

A slot opening ratio is defined as the width of the stator slot opening 70 divided by the edge gap 68. The slot opening ratio is preferably set approximately less than or equal to one. When the width of the stator slot opening 70 is wider than the edge gap 68, the electric machine 10 will produce a cogging torque with a relatively high magnitude.

Figure 5A:
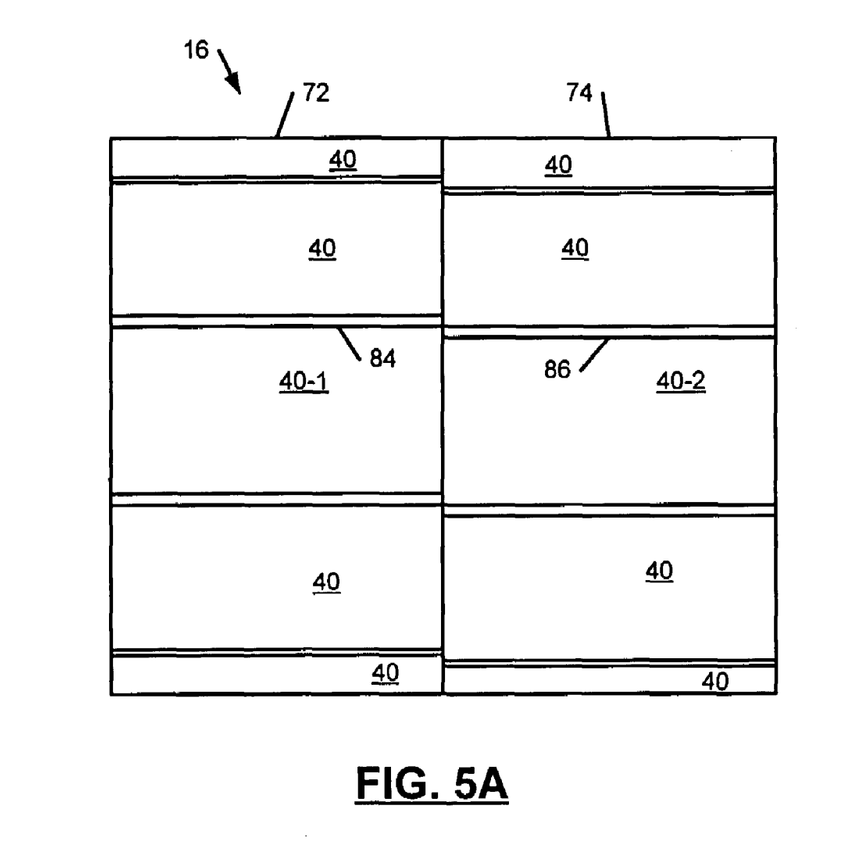
FIG. 5A illustrates first and second axial rotor sections of the rotor of FIG. 1.
Figure 5B:
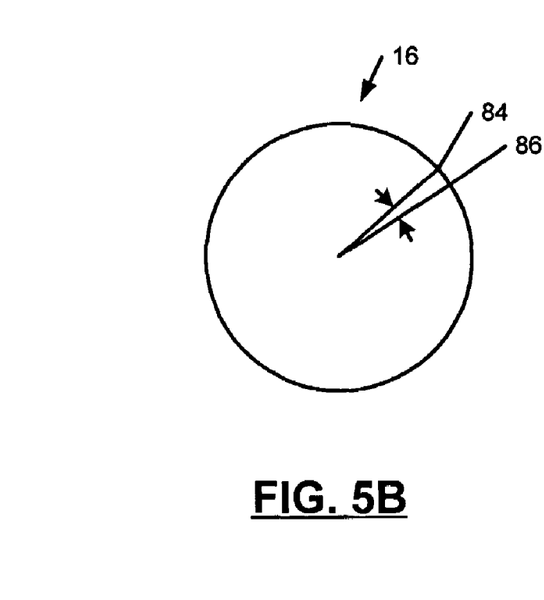
FIG. 5B illustrates a rotational offset angle of the permanent magnets illustrated in FIG. 5A.

Referring now to FIG. 5A, the rotor 16 includes two or more axial rotor sections. In FIG. 5A, two axial rotor sections are shown. First and second axial rotor sections 72 and 74 are rotationally offset by one half of the cogging angle. The cogging angle is defined as 360 degrees divided by the least common multiple of the number of stator slots and the number of rotor poles. In this case, the least common multiple of 12 and 10 is 60. 360 degrees divided by 60 is 6 degrees. A mechanical rotational offset angle of 3 degrees provides 180 (electrical) degree cancellation of the sinusoidal cogging torque waveforms. If additional rotor sections are employed, the offset angle for all of the axial rotor sections is equal to the cogging angle divided by the number of axial rotor sections. The rotational offset angle would be 2 degrees if three axial rotor sections are employed. An edge 84 of the permanent magnet 40-1 of the axial rotor section 72 is rotationally offset by the offset angle from an edge 86 of the permanent magnet 40-2 of the axial rotor section 74 as is illustrated in FIG. 5B.

Figure 6:
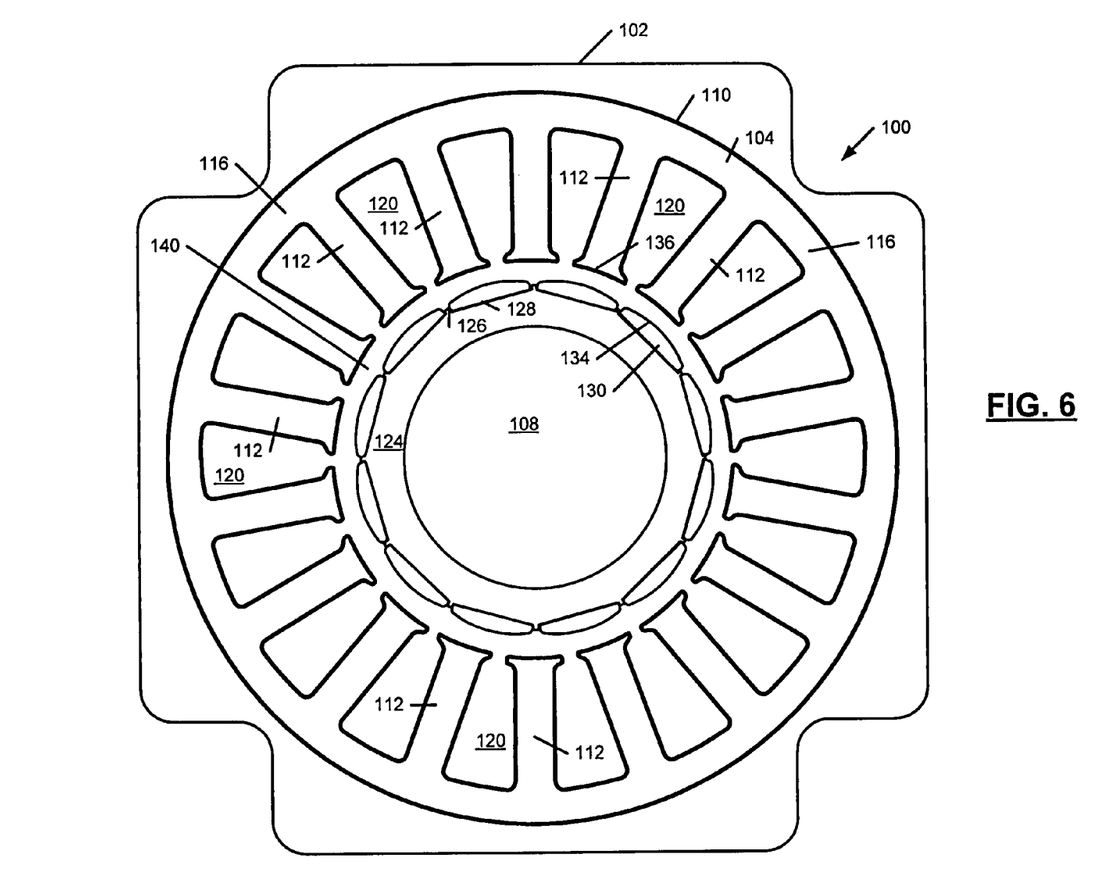
FIG. 6 illustrates a housing, a stator, a rotor and permanent magnets of an alternate permanent magnet electric machine according to present invention.

Referring now to FIG. 6, an alternate electric machine 100 is illustrated and includes a housing 102, a stator 104, a rotor 106, and a shaft 108. The alternate electric machine 100 has a construction that is similar to the electric machine 10 that is illustrated in FIG. 1. The stator 104 is mounted on an inner surface 110 of the housing 102. The stator poles 112 project radially inwardly from an outer rim 116 of the stator 104. The stator 104 includes a stack of interconnected stator plates. Inter-pole stator slots 120 are located between adjacent stator poles 112.

The rotor 106 includes two or more axial rotor sections similar to those shown in FIG. 5A. The axial rotor sections are rotationally offset by an offset angle that is equal to the cogging angle divided by the number of axial rotor sections. The rotor 106 includes an inner rim 124 and a radially outer surface 126 that includes magnet attachment surfaces 128. The magnet attachment surfaces 128 include grooves for receiving adhesive. Permanent magnets 130 are preferably adhered to the magnet attachment surfaces 128 on the radially outer surface 126 of the rotor 106. Other attachment methods may also be employed. A radially outer crown surface 134 of the permanent magnets 130 and a radially inner surface 136 of the stator poles 112 define an air gap 140.

In the embodiment illustrated in FIG. 6, the stator 104 includes eighteen stator slots 120 (or stator poles 112) and twelve rotor poles (or permanent magnets 130) in first and second axial rotor sections. The stator has an outer diameter of 101.7 mm. A radially inner surface of the outer rim 116 has a diameter of 92.2 mm. The stator teeth have width of 5.2 mm. The stator teeth are spaced at 20 degree intervals. The radially inner surface 136 of the stator poles 26 has a diameter of 55.5 mm. The stator slot opening 70 is 2.0 mm. The magnet dimension angle is preferably between 25 and 28 degrees. The air-gap ratio is between 1.35 and 2.5. The slot-opening ratio is less than or equal to 1.0.

The permanent magnets 130 have a thickness of 3.0 mm, a length of 26.5 mm, and a width of 10.7 to 11.7 mm. The radially outer crown surface preferably has a radius of 14.0 to 19.0 mm. Opposite lateral edges of the permanent magnets have a thickness of 1.8 mm to 2.2 mm. In this embodiment, the cogging angle is 10 degrees since the least common multiple of 18 and 12 is 36, and 360 degrees divided by 36 is 10 degrees. A mechanical rotational offset angle of 5 degrees provides 180 (electrical) degree sinusoidal cancellation of the cogging torque waveforms that are associated with the first and second axial rotor sections. The rotational offset angle would be 3.33 degrees if three axial rotor sections are employed.

The dimensions of the stator 14 and 104, the rotor 16 and 106, and the permanent magnets 40 and 130 have been selected such that the cogging torque waveforms that are generated by the axial rotor sections approach a symmetrical sinusoidal waveform. By rotationally offsetting the axial rotor sections by an offset angle equal to the cogging angle divided by the number of axial rotor sections, the cogging torque waveforms of the axial rotor sections substantially cancel and the cogging torque can be reduced significantly. While both of the permanent magnet electric machines 10 and 100 include first and second axial rotor sections, additional axial rotor sections can be added and rotationally offset in the manner described herein. In addition, the permanent magnets have a far less complex shape than skewed or herringbone permanent magnets, which reduces manufacturing complexity and material and assembling costs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A permanent magnet electric machine comprising:
    a stator having twelve stator slots; and
    a rotor including ten rotor poles and n axial rotor sections with permanent magnets, wherein said permanent magnets have a rectangular cross section, wherein n is greater than one and said n axial rotor sections are rotationally offset by an offset angle equal to a cogging angle divided by n, said cogging angle being equal to 360 degrees divided by the least common multiple of the number of the stator slots and the number of the rotor poles, and wherein said permanent magnets in each of said n axial rotor sections have substantially the same circumferential length,
    wherein a width of each of said twelve stator slots is greater than an edge gap defined as a distance between a radially outer surface of each of said permanent magnets and a radially inner surface of said stator taken along a radial line of said rotor,
    wherein said permanent magnet electric machine has n cogging torque waveforms that are substantially sinusoidally-shaped and that are associated with said axial rotor sections, and wherein said cogging torque waveforms substantially cancel.

2. The permanent magnet electric machine of claim 1 wherein said permanent magnets have a magnet dimension angle that is between 31 and 35 degrees.

3. The permanent magnet electric machine of claim 1 wherein n is 2 and said offset angle is 3 degrees.

4. The permanent magnet electric machine of claim 1 wherein n is 3 and said offset angle is 2 degrees.

5. The permanent magnet electric machine of claim 1 wherein said magnet dimension angle is approximately equal to 33 degrees.

6. The permanent magnet electric machine of claim 1 wherein an air-gap ratio is between 1.35 and 2.5.

7. The permanent magnet electric machine of claim 1 wherein a slot opening ratio is less than or equal to 1.0.

8. A permanent magnet electric machine comprising:
    a stator including twelve salient stator poles defining twelve stator slots therebetween;
    a rotor including n axial rotor sections that are rotationally offset by an offset angle equal to a cogging angle divided by n, wherein n is greater than 1, said cogging angle being equal to 360 degrees divided by a least common multiple of a number of rotor poles and the number of the stator slots, and said n axial rotor sections include ten rotor permanent magnets, wherein said permanent magnets have a rectangular cross section, wherein a magnet dimension angle of said permanent magnets is between 31 and 35 degrees, and wherein a width of each of said stator slots is greater than an edge gap defined as a distance between a radially outer surface of each of said permanent magnets and a radially inner surface of said stator taken along a radial line of said rotor.

9. The permanent magnet electric machine of claim 8 wherein an air-gap ratio is between 1.35 and 2.5.

10. The permanent magnet electric machine of claim 8 wherein a slot opening ratio is less than or equal to 1.0.

11. A permanent magnet electric machine comprising:
a stator including twelve salient stator poles defining twelve stator slots therebetween;
a rotor including n axial rotor sections that are rotationally offset by an offset angle equal to a cogging angle divided by n, said cogging angle being equal to 360 degrees divided by a least common multiple of a number of rotor poles and the number of the stator slots, wherein said n axial rotor sections include ten rotor permanent magnets, wherein said permanent magnets have a rectangular cross section, wherein an air-gap ratio is between 1.35 and 2.5, and wherein a width of each of said stator slots is greater than an edge gap defined as a distance between a radially outer surface of each of said permanent magnets and a radially inner surface of said stator taken along a radial line of said rotor.

12. The permanent magnet electric machine of claim 11 wherein a slot opening ratio is less than or equal to 1.0.

13. A permanent magnet electric machine comprising:
a stator including twelve salient stator poles that project from a rim of said stator and define twelve stator slots therebetween;
a rotor including n axial rotor sections that are rotationally offset by an offset angle equal to a cogging angle divided by n, said cogging angle being equal to 360 degrees divided by a least common multiple of a number of rotor poles and the number of the stator slots, wherein n is greater than 1 and said first and second axial rotor sections include ten rotor permanent magnets, wherein said permanent magnets have a rectangular cross section, and wherein a width of each of said stator slots is greater than an edge gap defined as a distance between a radially outer surface of each of said permanent magnets and a radially inner surface of said stator taken along a radial line of said rotor to provide a slot opening ratio less than or equal to 1.0.

14. A permanent magnet electric machine comprising:
a stator including eighteen salient stator poles defining eighteen stator slots therebetween;
a rotor including n axial rotor sections that are rotationally offset by an offset angle equal to a cogging angle divided by n, said cogging angle being equal to 360 degrees divided by a least common multiple of a number of rotor poles and the number of the stator slots, wherein n is greater than 1 and said n axial rotor sections include twelve permanent magnets, wherein said permanent magnets have a rectangular cross section, wherein said permanent magnets have a magnet dimension angle between 25 and 28 degrees, and wherein a width of each of said stator slots is greater than an edge gap defined as a distance between a radially outer surface of each of said permanent magnets and a radially inner surface of said stator taken along a radial line of said rotor.

15. The permanent magnet electric machine of claim 14 wherein an air-gap ratio is between 1.35 and 2.5.

16. The permanent magnet electric machine of claim 14 wherein a slot opening ratio is less than or equal to 1.0.

17. A permanent magnet electric machine comprising:
a stator including eighteen salient stator poles defining eighteen stator slots therebetween;
a rotor including n axial rotor sections that are rotationally offset by an offset angle equal to a cogging angle divided by n, said cogging angle being equal to 360 degrees divided by a least common multiple of a number of rotor poles and the number of the stator slots, wherein said n axial rotor sections include twelve permanent magnets, wherein said permanent magnets have a rectangular cross section, wherein an air-gap ratio is between 1.35 and 2.5, and wherein a width of each of said stator slots is greater than an edge gap defined as a distance between a radially outer surface of each of said permanent magnets and a radially inner surface of said stator taken along a radial line of said rotor.

18. The permanent magnet electric machine of claim 17 wherein a slot opening ratio is less than or equal to 1.0.

19. The electric machine of claim 11 wherein said permanent magnets in each of said n axial rotor sections have substantially the same circumferential length.

20. The electric machine of claim 13 wherein said permanent magnets in each of said n axial rotor sections have substantially the same circumferential length.

21. The electric machine of claim 14 wherein said permanent magnets in each of said n axial rotor sections have substantially the same circumferential length.

22. The electric machine of claim 17 wherein said permanent magnets in each of said n axial rotor sections have substantially the same circumferential length.

23. A permanent magnet electric machine comprising:
a stator including twelve axially aligned stator poles defining twelve stator slots therebetween; and
a rotor including n axial rotor sections with permanent magnets defining ten rotor poles, wherein said permanent magnets have a rectangular cross section, wherein n is greater than one and said n axial rotor sections are rotationally offset by an offset angle equal to a cogging angle divided by n, said cogging angle being equal to 360 degrees divided by a least common multiple of a number of the rotor poles and the number of the stator slots, and wherein a width of each of said stator slots is greater than an edge gap defined as a distance between a radially outer surface of each of said permanent magnets and a radially inner surface of said stator taken along a radial line of said rotor,
wherein said permanent magnet electric machine has n cogging torque waveforms that are substantially sinusoidally-shaped and that are associated with said axial rotor sections, and wherein said cogging torque waveforms substantially cancel.

24. A method of producing a permanent magnet electric machine, comprising:
providing a stator including twelve stator poles defining twelve stator slots therebetween;
providing a rotor including ten rotor poles and n axial rotor sections with permanent magnets, wherein said permanent magnets have a rectangular cross section, and wherein n is greater than one;
defining a width of each of said stator slots to be greater than an edge gap defined as a distance between a radially outer surface of each of said permanent magnets and a radially inner surface of said stator taken along a radial line of said rotor; and
rotationally offsetting said n axial rotor sections by an offset angle equal to a cogging angle divided by n, said cogging angle being equal to 360 degrees divided by a least common multiple of the number of the rotor poles and the number of the stator slots, wherein said permanent magnet electric machine has n cogging torque waveforms that are substantially sinusoidally-shaped and that are associated with said axial rotor sections, and wherein said cogging torque waveforms substantially cancel.

25. The method of claim 24 further comprising axially aligning stator poles of said stator.

26. The method of claim 25 wherein said permanent magnets in each of said n axial rotor sections have substantially the same circumferential length.

27. The electric machine of claim 8 wherein said permanent magnets in each of said n axial rotor sections have substantially the same circumferential length.

28. A permanent magnet electric machine comprising:

a stator including eighteen salient stator poles defining eighteen stator slots therebetween;

a rotor including n axial rotor sections that are rotationally offset by an offset angle equal to a cogging angle divided by n, said cogging angle being equal to 360 degrees divided by a least common multiple of a number of rotor poles and the number of the stator slots, wherein said n axial rotor sections include twelve permanent magnets, wherein said permanent magnets have a rectangular cross section, and wherein a width of each of said stator slots is greater than an edge gap defined as a distance between a radially outer surface of each of said permanent magnets and a radially inner surface of said stator taken along a radial line of said rotor to provide a slot opening ratio less than or equal to 1.0.

* * * * *